United States Patent

Boström

[11] Patent Number: 5,935,315
[45] Date of Patent: Aug. 10, 1999

[54] PIGMENT DISPERSION

[75] Inventor: Peter Boström, Ytterby, Sweden

[73] Assignee: Akzo Nobel nv, Arnhem, Netherlands

[21] Appl. No.: 09/095,332

[22] Filed: Jun. 10, 1998

Related U.S. Application Data

[63] Continuation of application No. PCT/SE96/01567, Nov. 29, 1996.

[30] Foreign Application Priority Data

Dec. 14, 1995 [SE] Sweden ..................... 9504474

[51] Int. Cl.$^6$ ................................................. C09D 17/00
[52] U.S. Cl. ............................ 106/499; 106/493; 106/504
[58] Field of Search ............................ 106/499, 504, 106/493

[56] References Cited

U.S. PATENT DOCUMENTS

| | | | |
|---|---|---|---|
| 4,156,616 | 5/1979 | Dietz et al. | 106/503 |
| 4,530,945 | 7/1985 | Christenson et al. | 106/499 |

FOREIGN PATENT DOCUMENTS

| | | | |
|---|---|---|---|
| 0 049 785 | 4/1982 | European Pat. Off. | C09D 17/00 |
| 0 084 645 | 8/1983 | European Pat. Off. | C09D 17/00 |
| 0 107 098 | 5/1984 | European Pat. Off. | C07C 103/44 |
| 97/21775 | 6/1997 | WIPO . | |

OTHER PUBLICATIONS

*International Search Report*, dated Mar. 14, 1997.

WPIDS Abstract No. 82–33366E, abstract of European Patent Specification No. 49785, Apr. 1982.

WPIDS Abstract No. 84–115695, abstract of European Patent Specification No. 107098, May 1984.

*Primary Examiner*—Anthony Green
*Attorney, Agent, or Firm*—Ralph J. Mancini

[57] ABSTRACT

The present invention relates to a low-viscosity pigment dispersion free from organic solvents and containing a fatty acid amidoalkoxylate as dispersing agent. The amidoalkoxylate is of the formula

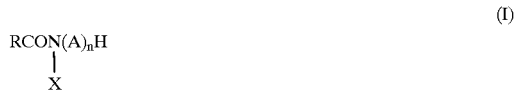

wherein R is an aliphatic hydrocarbon group having 7–22 carbon atoms, preferably 9–18 carbon atoms, A is an alkyleneoxy group having 2–3 carbon atoms, X is hydrogen or the group $(A)_nH$, wherein A has the meaning stated above, n is a number of 1–15, the sum of all n being 3–20. The pigment dispersion can be used in paints based on water as well as organic solvents.

10 Claims, No Drawings

PIGMENT DISPERSION

The present application is a continuation of International Application No. PCT/SE96/01567 which designated the U.S. and was filed on Nov. 29, 1996.

FIELD OF THE INVENTION

The present invention relates to a low-viscosity pigment dispersion free from organic solvents and containing a fatty acid amidoalkoxylate as dispersing agent. The pigment dispersion can be used in paints based on water as well as organic solvents.

BACKGROUND OF THE INVENTION

Today, more and more paints are produced which are water-based and completely free from organic solvents, such as glycol ethers. When toning these paints to the desired colour, use is made to a great extent of pigment dispersions, which can be used both for water-based paint and for paint based on organic solvents. The pigment dispersions are normally composed of pigments, fillers, dispersing agents and an aqueous phase in the form of ethylene glycol, di- and triethylene glycol, propylene glycol, dipropylene glycol, tripropylene glycol and glycerol. In most cases, the dispersing agent is a nonionic surface-active compound or a combination of nonionic and anionic surfactants. For environmental reasons, it is however desirable that the pigment dispersions are solvent-free.

U.S. Pat. No. 4,156,616 discloses a pigment dispersion containing as surface-active components an aminoethoxylate and an anionic surface-active compound. As liquid phase, alkylene glycols or formamide are used in the Examples.

European Patent 84 645 discloses a solid pigment preparation which is completely solvent-free and consists of pigments and a nonionic alkylene diamine to which propylene oxide and then ethylene oxide have been added.

European Patent Application 49 785 discloses a pigment dispersion containing inorganic pigments, an alkylene oxide adduct, a copolymer and water or a mixture of water and a water-retaining agent. The alkylene oxide adduct may consist of, for instance, a reaction product between ethylene oxide and a phenol, alcohol, carboxylic acid, carboxylic acid amide or alkyl amine. In all Examples, at least one organic solvent is present in a considerable quantity. Thus, Example 10 describes a pigment dispersion which contains, among other things, 10 parts by weight of a copolymer, 15 parts of an ethylene oxide adduct of tall oil fatty acid monoethanol amide reacted with ethylene oxide, 100 parts of tripropylene glycol and 90 parts of water. By adding the copolymer, it is evident that the dispersion is changed from non-fluid, solid paste to pourable form.

The object of the present invention is to provide a homogeneous pigment dispersion which is completely free from organic solvents and which, without causing flocculations which may cause unacceptable differences in color, may be used in water-based paints as well as paints containing organic solvents. A further object is that the included dispersing agents should be easily degradable and have an $LC_{50}$ and $EC_{50}$ above 1.0 mg/l. These and other objects are realized by the invention embodied by the present claims.

SUMMARY OF THE INVENTION

The present invention generally relates to a pigment dispersion containing coloring pigments and a nonionic surface-active compound. The claimed dispersion is free from organic solvents and contains a) 1.0–65% by weight of a coloring pigment,
b) 4–20% by weight of a water-soluble or water-dispersible amidoalkoxylate of the formula

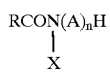

(I)

wherein R is an aliphatic hydrocarbon group having 7–22 carbon atoms, preferably 9–18 carbon atoms, A is an alkyleneoxy group having 2–3 carbon atoms, X is hydrogen or the group $(A)_nH$, wherein A has the meaning stated above, n is a number from 1–15, the sum of all n being 3–20, c) 15–86% by weight of water,
d) 0–20% by weight of a filler,
e) 0–5% by weight of an anionic and/or amphoteric surfactant,
f) 0–2% by weight of a water-retaining polymer.

DETAILED DESCRIPTION OF THE INVENTION

The present invention relates to a pigment dispersion which is completely free from organic solvents and contains a) 1.0–65% by weight of a coloring pigment,
b) 4–20% by weight of a water-soluble or water-dispersible amidoalkoxylate of the formula

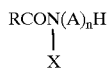

(I)

wherein R is an aliphatic hydrocarbon group having 7–22 carbon atoms, preferably 9–18 carbon atoms, A is, independently of each other, an alkyleneoxy group having 2–3 carbon atoms, X is hydrogen or the group $(A)_nH$, wherein A has the meaning stated above, n is a number of 1–15, the sum of all n being 3–20, c) 15–86% by weight of water,
d) 0–20% by weight of a filler,
e) 0–5% by weight of an anionic and/or amphoteric surfactant,
f) 0–2% by weight of a water-retaining polymer.

For dispersions of low viscosity, i.e. below 5000 cP, and/or high contents of pigments, i.e. above 20% by weight, preferably 30–50% by weight, compounds of formula 1 are preferred, which to at least 50% by weight consist of compounds, wherein R is an aliphatic group having 8–13 carbon atoms. Suitable amidoalkoxylates are, for instance, those based on coconut oil fatty acids, rape-seed oil fatty acids or linseed oil fatty acids or mixtures thereof. Alkylene oxides preferably consist of ethylene oxide or mixtures of ethylene oxide and propylene oxide, where the molecular ratio of ethylene oxide to propylene oxide is at least 1. The amount of alkyleneoxy groups is 3–16 mole per mole carboxylic acid amide. Ethoxylates are preferred, in which the total number of ethylene-oxide-derived ethyleneoxy groups is 4–15, preferably 4–10 per mole carboxylic acid amide and X in the formula 1 is hydrogen. For dispersions based on inorganic pigments, such as iron oxide and titanium oxide, amidoethoxylates are suitably selected, in which the total number of ethyleneoxy groups is 8–15, whereas for dispersions having organic pigments amidoethoxylates having totally 4–10 ethyleneoxy groups in a single polyethylene glycol chain are preferred.

The pigments may consist of organic as well as inorganic pigments. Suitable inorganic pigments are, for example, iron oxides, chromium oxides, titanium oxides, chromium titan yellow and carbon black. Organic pigments are, for instance, azo, phthalo, cyanide and quinacridon pigments and derivatives from thionindigo and dioxazine.

When formulating pigment dispersions having high contents, usually above 40% by weight of inorganic pigments, for instance iron oxide, an undesired gel formation may sometimes occur. In such cases, it is advantageous to strengthen the dispersing effect of the amidoalkoxylate by adding 0.2–4.0% by weight of the pigment dispersion of an anionic and/or amphoteric surface-active compound, i.e. compounds having an anionic group and one or more hydrocarbon groups having 8–22 carbon atoms. Examples of suitable anionic surface-active compounds are carboxylates containing an aliphatic group of 8–22 carbon atoms; aliphatic and aromatic sulphates or sulphonates, in which the aliphatic group or aromatic group contains 8–22 carbon atoms; aliphatic and aromatic mono- or disubstituted phosphates or phosphonates, in which the aliphatic or aromatic group contains 8–22 carbon atoms; and ether sulphates or mono- or disubstituted ether phosphates containing an aliphatic or aromatic group having 8–22 carbon atoms with an ether group of the formula $$-(OA)_n-,$$

wherein A is an ethylene or propylene group and n is 1–5. Lauryl ether sulphate and nonylphenyl ether sulphate having 2–4 oxyethylene groups are particularly suitable. Examples of suitable amphoteric surface-active compounds are lecithin and quaternary ammonium compounds of betaine type.

Suitable water-retaining polymers are cellulose derivatives, such as hydroxyethyl cellulose, ethyl hydroxyethyl cellulose, methyl hydroxyethyl cellulose, methyl hydroxypropyl cellulose, methyl cellulose, hydroxypropyl cellulose and carboxy methyl cellulose. The addition thereof prevents a possible drying of the pigment pastes when contacting air.

If desired, the pigment dispersions may also contain fillers in order to give them a suitable consistency. Examples of suitable fillers are caolin, glimmer, mica and other silica oxides. The content preferably constitutes 0.5–15% by weight of the dispersion.

Apart from the additives mentioned above, the pigment dispersion may also contain a number of conventional additives such as antifoaming agents, pH-adjusting agents, bactericides and corrosion-inhibiting agents.

The pigment dispersion according to the invention can be produced by first preparing a pigment-free mixture of the surface-active compounds, the water, the antifoaming agents and any other additives, and subsequently adding the pigment portion which is dispersed in the mixture. The dispersion can be carried out by means of a dissolver or grinder, for instance a ball grinder or roller mill.

The pigment dispersion may, as mentioned above, be used when formulating both water-based and organo-based paints. They should therefore be compatible with the binders that are usually to be found in the paints. For water-based paints, the binder usually consists of a latex, but also an alkyd may be used. Examples of suitable latex binders, in which the inventive pigment dispersion has shown excellent properties, are polyvinyl acetate, copolymers of vinyl acetate and methyl acrylate, copolymers of vinyl acetate and ethylene, copolymers of vinyl acetate, ethylene and vinyl chloride, and copolymers of styrene and methyl acrylate. For paints with organic solvents, the binder preferably is an alkyd or a dried oil, such as linseed oil or tall oil.

The present invention is further illustrated by the following Examples.

EXAMPLE 1

The following pigment pastes were produced.

| Component | Part by weight |
|---|---|
| Blue Pigment Dispersion | |
| Coconut acyl-NH(C$_2$H$_4$O)$_5$H | 20 |
| Dehydran 1620 | 0.5 |
| Heliogen Blue 7080 | 25.0 |
| Water | 55 |
| | 100.5 |
| Yellow Pigment Dispersion | |
| Coconut acyl-NH(C$_2$H$_4$O)$_5$H | 11 |
| Water | 31 |
| Dehydran 1620 | 1.0 |
| Phospate ester (Berol 522) | 2.0 |
| BayFerrox 3920 | 55.0 |
| | 100.0 |
| Black Pigment Dispersion | |
| Coconut acyl-NH(C$_2$H$_4$O)$_5$H | 12 |
| Dehydran 1620 | 0.5 |
| Water | 57.5 |
| Pintex G PS 165 | 30 |
| | 100.0 |

The viscosity of the resultant pigment dispersions was measured at 20° C. according to Brookfield RPM-12.

Then these pigment dispersions were added in an amount of 5% by weight to water-borne latex paint on acrylate-base and containing titanium dioxide, and to two different alkyd paints with white spirit as solvent. Alkyd A had an oil absorption value of 78, while alkyd B had an oil absorption value of 65.

The pigmented paints were shaken for 3 min, whereupon they were applied in a 200 μm-thick layer on a sheet of paper. A finger was used to make a circle of a diameter of 3–5 cm in the newly applied layer (a so-called rub-out test). When the paint had dried, the difference in color was visually estimated between the treated surface and the untreated surface on the scale of 1:10, the numeral 10 stating that there was no difference in color and the numeral 8 that the difference is acceptable. The numeral 7 and below indicates that the difference in color cannot be accepted. The following results were obtained.

| Paint | Pigment dispersion | Viscosity mPa'S | Estimate |
|---|---|---|---|
| | Black | 500 | |
| | Blue | 3,500 | |
| | Yellow | 29,000 | |
| Alkyd A | Black | | 10 |
| Alkyd A | Blue | | 10 |

| Paint | Pigment dispersion | Viscosity mPa'S | Estimate |
| --- | --- | --- | --- |
| Alkyd A | Yellow | | 10 |
| Latex | Black | | 10 |
| Latex | Blue | | 10 |
| Latex | Yellow | | 10 |
| Alkyd B | Black | | 9 |
| Alkyd B | Blue | | 8 |
| Alkyd B | Yellow | | 10 |

As appears from the results, in most cases no difference in color was obtained irrespectively of whether the paint contained organic solvents or water. In all cases, an acceptable result was obtained.

EXAMPLE 2

Pigment pastes of the same type as described in Example 1 were prepared while using the following nonionic surface-active compounds. Otherwise, the composition of the pigment dispersions conformed with the pigment dispersions in Example 1.

TABLE

Nonionic Surface-active compound

| Designation | Compound |
| --- | --- |
| 1 | $R_1C(O)NH(C_2H_4O)_6H$ |
| 2 | $R_2C(O)NH(C_2H_4O)_8H$ |
| A | $C_{13}H_{27}O(C_2H_4O)_{10}H$ |
| B | $C_{16}$-alkyl-$NH_2$ + 7 EO |
| C | $R_3$—$NH_2$ + 10 EO |
| D | $C_{11}H_{23}O(C_2H_4O)_8H$ |
| E | $C_{9-11}H_{19-23}O(C_2H_4O)_6H$ |

$R_1C$=$O$ = acyl group of the linseed oil
$R_2C$=$O$ = acyl group of the rape-seed oil
EO = ethylene oxide
$R_3C$=$O$ = alkyl group of the linseed oil The viscosity of the resultant pigment dispersions was measured and those having an acceptable viscosity were then mixed with the latex paint and alkyd paints in Example 1 in an amount of 5% by weight based on the weight of the paint. After mixing, the rub-out test was carried out, and the differences in color were measured as stated in Example 1. The following results were obtained.

| Paint | Dispersing agent | Dispersion | Viscosity mPa·S | Difference in colour |
| --- | --- | --- | --- | --- |
| | 1 | Black | 9,000 | |
| | 1 | Blue | 9,000 | |
| | 1 | Yellow | 34,000 | |
| Alkyd A | 1 | Black | | 10 |
| | | Blue | | 10 |
| | | Yellow | | 10 |
| Latex | 1 | Black | | 10 |
| | | Blue | | 10 |
| | | Yellow | | 10 |
| Alkyd B | 1 | Black | | 9 |
| | | Blue | | 9 |
| | | Yellow | | 10 |
| | 2 | Black | 6,500 | |
| | 2 | Blue | 32,000 | |
| | 2 | Yellow | 19,000 | |
| Alkyd A | 2 | Black | | 10 |
| | | Blue | | 10 |
| | | Yellow | | 10 |
| Latex | 2 | Black | | 10 |
| | | Blue | | 10 |
| | | Yellow | | 10 |
| Alkyd B | 2 | Black | | 9 |
| | | Blue | | 10 |
| | | Yellow | | 10 |
| | A | Black | 100 | |
| | A | Blue | 28,000 | |
| | A | Yellow | 12,500 | |
| Alkyd A | A | Black | | 5 |
| | | Blue | | 10 |
| | | Yellow | | 2 |
| Latex | A | Black | | 10 |
| | | Blue | | 10 |
| | | Yellow | | 8 |
| Alkyd B | A | Black | | 5 |
| | | Blue | | 10 |
| | | Yellow | | 3 |
| | B | Black 1) | 320 | |
| | B | Blue | — | |
| | B | Yellow | >100,000 | |
| Alkyd A | B | Black | | 10 |
| | | Yellow | | 10 |
| Latex | B | Black | | 10 |
| | | Yellow | | 10 |
| Alkyd B | B | Black | | 8 |
| | | Yellow | | 10 |
| | C | Black 1) | 3,200 | |
| | C | Blue | — | |
| | C | Yellow | >100,000 | |
| Alkyd A | C | Black | | 10 |
| | | Yellow | | 10 |
| Latex | C | Black | | 10 |
| | | Yellow | | 10 |
| Alkyd B | C | Black | | 8 |
| | | Yellow | | 10 |
| | D | Black 1) | 125 | |
| | D | Blue | — | |
| | D | Yellow | 20,000 | |
| Alkyd A | D | Black | | 6 |
| | | Yellow | | 10 |
| Latex | D | Black | | 10 |
| | | Yellow | | 10 |
| Alkyd B | D | Black | | 5 |
| | | Yellow | | 10 |
| | E | Black | 5,000 | |
| | E | Blue | 15,000 | |
| | E | Yellow | 33,000 | |
| Alkyd A | E | Black | | 6 |
| | | Blue | | 7 |
| | | Yellow | | 10 |
| Latex | E | Black | | 10 |
| | | Blue | | 8 |
| | | Yellow | | 10 |
| Alkyd B | | Black | | 5 |
| | | Blue | | 5 |
| | | Yellow | | 10 |

1) Homogeneous pigment dispersions could not be produced owing to too high a viscosity.

As appears from the results, the paints containing the pigment dispersions 1 and 2 according to the present invention have less differences in color than the paints containing the pigment dispersions A–E with alkylene oxide adducts as dispersing agent. Besides, the dispersing agents B and C have an $LC_{50}$ and $EC_{50}$ above 1.

We claim:

1. A coloring pigment dispersion which is free from organic solvents comprises:

a) 1.0–65% by weight of a coloring pigment, b) 4–20% by weight of a nonionic water-soluble or water-dispersible amidoalkoxylate surfactant of the formula

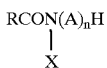 (I)

wherein R is an aliphatic hydrocarbon group having 7–22 carbon atoms, A is an alkyleneoxy group having 2–3 carbon atoms, X is hydrogen or the group $(A)_nH$, wherein A has the meaning stated above, n is a number from 1–15, and the sum of all n is 3–20, c) 15–86% by weight of water, d) 0–20% by weight of a filler, e) 0–5% by weight of an anionic and/or amphoteric surfactant, and f) 0–2% by weight of a water-retaining polymer.

2. The pigment dispersion of claim 1 wherein the amidoalkoxylate is based on coconut oil fatty acids, rape-seed oil fatty acids or linseed oil fatty acids or mixtures thereof.

3. The pigment dispersion of claim 1 wherein at least 50% by weight of the amidoalkoxylate consists of compounds, wherein R is an aliphatic group having 8–13 carbon atoms.

4. The pigment dispersion of claim 1 wherein in formula (I), A is an ethyleneoxy group, n is a number of 4–15 and X is hydrogen.

5. The pigment dispersion of claim 1 wherein the coloring pigment is inorganic and the total number of ethyleneoxy groups in the amidoethoxylate is 8–15.

6. The pigment dispersion of claim 1 wherein the coloring pigment is organic and the total number of ethyleneoxy groups in the amidoethoxylate is 4–10.

7. The pigment dispersion of claim 1 which has a viscosity below 5000 cP and a pigment content of above 20% by weight.

8. The pigment dispersion of claim 1 which contains 0.2–4.0% by weight of an anionic and/or amphoteric surfactant containing at least one hydrocarbon group having 8–22 carbon atoms.

9. The pigment dispersion of claim 1 wherein R is an aliphatic hydrocarbon group having 9–18 carbon atoms.

10. A paint product which contains as binder a latex, an alkyd or a drying oil, and which comprises a coloring pigment dispersion according to claim 1.

* * * * *